US008736933B2

(12) United States Patent
Leopold et al.

(10) Patent No.: US 8,736,933 B2
(45) Date of Patent: May 27, 2014

(54) METHOD AND DEVICE FOR PRODUCING COLORED INDIVIDUALIZED HOLOGRAMS (75) Inventors: André Leopold, Berlin (DE); Christian Kunath, Berlin (DE); Jens Ehreke, Berlin (DE); Gerhard Hochenbleicher, Fürstenfeldbruck (DE); Christian Klepzig, München (DE); Michael Langgassner, Pliening (DE)

(73) Assignee: Bundesdruckerei GmbH, Berlin (DE)

( * ) Notice: Subject to any disclaimer, the term of this patent is extended or adjusted under 35 U.S.C. 154(b) by 950 days.

(21) Appl. No.: 12/676,406

(22) PCT Filed: Sep. 3, 2008

(86) PCT No.: PCT/EP2008/007406
§ 371 (c)(1),
(2), (4) Date: May 27, 2010

(87) PCT Pub. No.: WO2009/030501
PCT Pub. Date: Mar. 12, 2009

(65) Prior Publication Data
US 2010/0265553 A1 Oct. 21, 2010

(30) Foreign Application Priority Data

Sep. 4, 2007 (DE) .......................... 10 2007 042 386

(51) Int. Cl.
G03H 1/12 (2006.01)
(52) U.S. Cl.
USPC ............................................. 359/11; 359/22
(58) Field of Classification Search
USPC ............... 359/10–14; 369/103, 44, 47; 355/2; 365/216
See application file for complete search history.

(56) References Cited

U.S. PATENT DOCUMENTS

| 6,439,724 | B1 * | 8/2002 | Jeon et al. ........................ 353/31 |
| 6,728,014 | B2 * | 4/2004 | Kodama .......................... 359/12 |
| 7,161,722 | B2 | 1/2007 | Brotherton-Ratcliffe et al. |
| 7,245,406 | B2 * | 7/2007 | Funada et al. .................. 359/12 |

(Continued)

FOREIGN PATENT DOCUMENTS

DE 102005054396 A1 6/2006
DE 102006061220 * 6/2008

(Continued)

Primary Examiner — James Greece
Assistant Examiner — Sharrief Broome
(74) Attorney, Agent, or Firm — Laurence A. Greenberg; Werner H. Stemer; Ralph E. Locher (57) ABSTRACT A method produces colored individualized holograms for use as security elements for documents, and to a device for producing individualized holograms. The method generates light formed of different colors, spatially modulates the light, color by color, in an individual manner, optically guides the modulated light such that the light is at least partially refracted and/or reflected on a holographic master and is superposed in a holographic recording material with the modulated non-refracted and/or reflected light, and records the hologram. The light is modulated, color by color and at the same time, by a plurality of spatial light modulators. Every color is associated with its own spatial light modulator and a plurality of monochrome modulated light beams of the plurality of colors is combined in a collinear manner prior to refraction and/or reflection on the holographic master and the superposition in the recording material to give a multicolor exposure light beam.

33 Claims, 5 Drawing Sheets

(56) References Cited

U.S. PATENT DOCUMENTS

| | | |
|---|---|---|
| 2002/0191235 A1* | 12/2002 | O'Connor et al. ............ 359/9 |
| 2004/0090679 A1* | 5/2004 | Kowarz ..................... 359/634 |
| 2006/0082851 A1 | 4/2006 | Toishi |
| 2007/0064290 A1* | 3/2007 | Hochenbleicher et al. ..... 359/22 |
| 2007/0103788 A1* | 5/2007 | Magarill et al. ............. 359/634 |
| 2007/0121433 A1* | 5/2007 | Nagura ..................... 369/44.11 |
| 2007/0147065 A1* | 6/2007 | Nagata ..................... 362/553 |
| 2010/0067076 A1* | 3/2010 | Brotherton-Ratcliffe ...... 359/12 |

FOREIGN PATENT DOCUMENTS

| | | |
|---|---|---|
| DE | 102006061220 A1 | 6/2008 |
| EP | 0896260 A2 | 2/1999 |
| JP | 3148687 A | 6/1991 |
| WO | 2007127758 A2 | 11/2007 |
| WO | 2008074306 A1 | 6/2008 |

* cited by examiner

METHOD AND DEVICE FOR PRODUCING COLORED INDIVIDUALIZED HOLOGRAMS

BACKGROUND OF THE INVENTION

Field of the Invention

The invention relates to a method for producing colored individualized holograms, used in particular as security elements for security documents and/or valuable documents, and also to a device for producing individualized holograms.

Security elements serve to protect a security document and/or valuable document against forgery or copying. Holograms constitute one type of security elements. Security elements often also contain individualizing indications, for example serial numbers, identification numbers, biometric data, images (passport photographs), etc. These can be provided as plain text or in image form or in optically coded fashion or in machine-readable fashion.

The basic procedure during the production of holograms with individualizing indications is described in the literature reference EP 0 896 260 A2, for example. The basic principles are explained briefly below. Firstly, a holographic master with a master hologram is produced. The holographic master is then positioned behind a holographic recording material, for example in areal contact, if appropriate in a manner separated by a protective film. Coherent light, for example from a laser, is radiated onto that side of the holographic recording material which is remote from the holographic master, typically with a defined wavelength and a defined angle of incidence, in accordance with the holographic pattern to be reconstructed from the holographic master. Said light penetrates through the holographic recording material and is diffracted and/or reflected by the master, wherein the hologram is reconstructed by interference with the incident light and the hologram is imaged in the holographic recording material and stored by photochemical or photophysical processes in the holographic recording material. In this case, the holographic master can be designed in such a way that it is sensitive to a plurality of wavelengths and correspondingly diffracts the latter. Individualization takes place by means of modulation of the light used. Geometric arrangements other than the arrangements described here are also possible.

In the case of the method known in this respect, a colored exposure takes place using a colored spatial light modulator with illumination by means of a white light laser or by means of three differently colored lasers in the customary color triangle. In order to produce a hologram with a holographic master that effects colored reconstruction, a whole-area exposure or exposure using a scanning beam takes place, wherein the exposure is modulated in a suitable manner, such as, for example, during pixel-by-pixel writing or line-by-line writing. The method known in this respect is complex in its embodiment and requires spatial light modulators that can be modulated correspondingly in colored fashion. Moreover, the diffraction efficiency per wavelength is rather low by account of the superimposition of different colors of the color triangle at one and the same locations or in the pixels of the hologram.

The prior art discloses digital projectors which operate with spatial light modulators in the form of liquid crystal displays (LCD). The functioning corresponds to the projection of a transparency, for example, where the spatial light modulator replaces the transparency.

The prior art furthermore discloses digital projectors which comprise a DMD (digital micromirror device) as spatial light modulator. The DMD is sequentially driven with partial images having the respective primary color and a rotating color wheel having alternating color segments in the primary colors is disposed downstream of the DMD. In this case, the driving of the DMD with partial images is synchronized with the rotational movement of the color wheel with the provision that the DMD is always driven with that partial image which corresponds to the color of the color segment situated in the beam path. In this case, the frequency of the color changes in the color wheel is high enough such that the human eye cannot distinguish partial images, but rather combines the partial images to form an overall image. One variant employs three DMDs, one for each primary color, which are driven with partial images assigned to the respective primary color.

The prior art likewise discloses prototypes of laser projectors, wherein the light from three lasers having the three primary colors is scanned by means of rotating mirror wheels, analogously to an electron beam of a picture tube, line by line over a projection area.

The literature reference DE 2005 054 396 A1 discloses the use of a spatial light modulator in the form of a digital micromirror device (DMD) for marking objects.

All these methods, if they were applied to exposure for the purpose of producing colored holograms, would likewise manifest the disadvantage that the diffraction efficiency per wavelength is rather low on account of the superimposition of different colors of the color triangle at one and the same locations or in the pixels of the hologram.

BRIEF SUMMARY OF THE INVENTION

Technical Problem of the Invention

The invention addresses the technical problem of providing an improved method and an improved device for producing colored holograms which have an improved spectral diffraction efficiency and, in particular, permit time-saving production.

DEFINITIONS

A security element is a structural unit comprising at least one security feature. A security element can be an independent structural unit that can be connected, for example adhesively bonded, to a security document and/or valuable document, but it can also be an integral part of a security document and/or valuable document. One example of the former is a visa that can be adhesively bonded onto a security document and/or valuable document. One example of the latter is a hologram integrated, for example laminated, into a banknote or an identity card.

A security feature is a structure which can be produced or reproduced in an unauthorized manner only with increased effort (compared with simple copying) or not at all.

A pattern typically consists of a multiplicity of pattern units or pixels arranged alongside one another. The pattern units or pixels of a pattern are assigned to one another and arranged laterally with respect to one another in a defined manner, typically in two spatial dimensions, and when considered overall produce a representation, for example an image, symbol, logo, text (letters, numerals, alphanumeric) or code (e.g. bar code).

In the context of the terminology of the present summary of the invention, the term pixel is used in modified fashion in the context of a hologram. Whereas in the prior art and the above description in this respect a single pixel can have any desired color that can be formed from the three primary colors, an isolated pixel in the context of the invention is intended to have only a single color, mainly the color assigned to the respective pixel. In relation to the terminology of the prior art, a pixel within the meaning of the invention would be a sub-pixel and the expression pixel is used for the invention for simplification purposes. A full-colored color impression arises in the context of the invention by virtue of the fact that the density of the pixels according to the invention is so high that the human eye cannot distinguish them and, consequently, as it were mixes the color to be represented in the relevant region of the hologram from different diffraction efficiencies or "brightnesses" of adjacent pixels with different primary colors. A pixel according to the invention has an area of typically in the range of 1 $\mu m^2$ to $10^6$ $\mu m^2$, in particular $10^2$ $\mu m^2$ to $10^5$ $\mu m^2$. The absence of color means that no color is discernible. A pixel according to the invention wherein a color is absent can be, for example, black, gray, white, or transparent.

The following shall be mentioned merely by way of example as security documents and/or valuable documents: personal identity cards, passports, ID cards, access control identity cards, visas, tax stamps, tickets, driving licenses, motor vehicle papers, banknotes, checks, postage stamps, credit cards, any smart cards and adhesive labels (e.g. for product security). Such security documents and/or valuable documents typically have a substrate, a printing layer and optionally a transparent covering layer. A substrate is a carrier structure to which the printing layer comprising information, images, patterns and the like is applied. Appropriate materials for a substrate include all conventional paper- and/or plastic-based materials in the art.

A spatial light modulator (SLM) permits two-dimensionally spatially resolved illumination or irradiation of a usually planar object with modulated intensity and/or phase. This can involve for example a DMD (Digital Micromirror Device) chip, an LCD (Liquid Crystal Display) transmission display or an LCoS (Liquid Crystal on Silicon) display. What they all have in common is that a multiplicity of SLM pixels are formed, wherein each SLM pixel can be activated or deactivated independently of other SLM pixels (intermediate stages are also possible), whereby patterns or images can be projected by means of corresponding driving of the SLM pixels. By virtue of the free drivability, it is also readily possible to generate different images or patterns one after another in temporal succession, for example in the form of a passport photograph.

A code or pattern is individualizing if it is unique for a person or an object or a group of persons or objects from a larger overall set of persons or objects. A code which is individualizing for a group of persons within the overall set of the inhabitants of a country is for example the town/city of residence. A code which is individualizing for a person is for example the number on the personal identity card or the passport photograph. A code which is individualizing for a group of banknotes within the overall set of banknotes is the value. What is individualizing for a banknote is the serial number. Examples of non-individualizing codes or patterns are coats of arms, seals, national emblems, etc., for security or valuable documents of a sovereign territory.

A holographic recording material is a layer composed of a material which is photosensitive, in which layer holographs can be stored by irreversible, but also reversible photochemical and/or photophysical processes by way of exposure. The material used is irrelevant in the context of the invention. All known materials can be used, and so reference may be made to the technical literature of the person of average skill in the art. The photopolymers that are conventional in holography shall be mentioned merely by way of example.

The term color is understood as a wavelength or a spectral line in the context of the invention. Mixed colors have a plurality of different wavelengths or spectral lines. The term color therefore encompasses not only the visible region but also UV and IR. An entity is referred to as colored if it comprises a plurality of colors or its optical impression is characterized by a plurality of colors (wavelengths). In this sense, a monochromic red laser beam is not regarded as colored, but rather as single-colored.

BASIC PRINCIPLES OF THE INVENTION AND PREFERRED EMBODIMENTS

A method is proposed in which light having a plurality of different colors (wavelengths) is generated, the light is spatially modulated individually in a color-separated manner, the modulated light is optically guided in such a way that the light is at least partly diffracted and/or reflected at a holographic master and is superimposed with the modulated non-diffracted and/or -reflected light in one holographic recording material in such a way that an interference pattern representing a multicolored individualized hologram forms and the multicolored individualized hologram is recorded. In order to solve the problem, it is provided that the light is modulated simultaneously in a color-separated manner by means of a plurality of spatial light modulators, wherein each of the plurality of colors of the light is assigned a dedicated spatial light modulator that individually modulates a single-colored light beam having the corresponding color, and the plurality of single-colored modulated light beams having the plurality of colors, prior to the diffraction and/or reflection at the holographic master and the superimposition in the holographic recording material are combined collinearly to form a multi-colored exposure light beam modulated individually in a color-separated manner, wherein the spatial light modulators are arranged with respect to one another in such a way, and the beam combining is performed in such a way, that each of the pixels of the individualized hologram is assigned exactly one of the plurality of colors (independently of the modulation). A multicolored light beam is understood to be a light beam comprising light having different colors (wavelengths). A multicolored light beam that is spatially modulated individually in a color-separated manner is therefore a light steel in which the proportions assigned to the individual colors are spatially modulated in each case independently of one another for the purpose of individualizing the hologram. In this case, the modulation of the individual single-colored light beams is performed in accordance with color pixel patterns assigned to the colors. Said color pixel patterns are generally chosen, however, such that they respectively represent a color component of a multicolored overall pattern. The choice of the color pixel patterns and the combining of the individually modulated single-color light beams are effected in such a way that an imaging of the combined multicolored exposure light beam images all the color pixel patterns in superimposed fashion in such a way that the pixels of different color pixel patterns do not overlap. Consequently, each location in the imaging plane can be assigned exactly one of the plurality of colors (or no colors). In this case, it should be emphasized that, during the production of a plurality of different individualized multicolored holograms, mutually corresponding pixels of said holograms do not always have to be assigned to the same color. An assignment of the pixels in the overall pattern to the individual colors from the plurality of colors is preferably calculated in order to bring about a specific desired color impression of the overall pattern for an observer.

Consequently, there is produced a holographic security element with a holographic recording material, in which a multicolored two-dimensional (overall) pattern in the form of a hologram is formed, wherein the (overall) pattern is formed by pixels, wherein each pixel is assigned exclusively one of a plurality of colors, and wherein each pixel can have either one of the plurality of colors or no color. For the production of such a multicolored holographic security element, that is to say of a colored individualized hologram, a device is proposed, comprising a light source, which provides light having a plurality of different colors (wavelengths), an individualization unit, which spatially modulates the light individually in a color-separated manner, wherein the modulated light is optically guided in such a way that the light is at least partly diffracted and/or reflected at a holographic master and is superimposed with the modulated non-diffracted and/or -reflected light in one holographic recording material in such a way that an interference pattern representing the multicolored individualized hologram forms and the colored individualized hologram is stored, wherein, in order to solve the technical problem, it is provided that the individualization unit comprises a plurality of spatial light modulators, wherein each of the plurality of colors have the light is assigned a dedicated spatial light modulator, and comprises a feeding and combining optical unit, wherein said feeding and combining optical unit is designed for directing single-colored light beams onto the spatial light modulators assigned to the respective colors, which spatial light modulators individually modulate the corresponding single-colored light beams simultaneously in accordance with corresponding color pixel patterns, and for collinearly combining the single-colored modulated light beams to form an exposure light beam, and the spatial light modulators are oriented with respect to one another and driven in such a way that the beam combining is performed in such a way that each of the pixels of the individualized hologram is assigned exactly one of the plurality of colors or no color (independently of the modulation). The color-separated individualization, that is to say individualization separated according to colors, of the multicolored light is thus effected by means of a plurality of spatial light modulators that are combined in an individualization unit. In this case, the spatial light modulators are preferably arranged on a common carrier unit. The spatial light modulators are fixedly oriented with respect to one another. It goes without saying, however, that they are preferably provided with adjusting devices, or mounted thereon, in order to allow adjustment. In order to ensure beam feeding to the individual spatial light modulators and combining of the individual single-colored individually modulated light beams to form an exposure light beam in such a way that pixels imaged in the holographic recording material are assigned to exactly one color or no color, the feeding and combining optical unit is also accommodated in the individualization unit. Preferably, the optical elements of the feeding and combining optical unit are arranged on the same carrier unit as the spatial light modulators. The carrier unit can preferably be an optical table. However, it is possible to use any suitable constructional unit which meets the requirements that are customary in precision optics. The individual spatial light modulators can all comprise an identical number of pixels and pixel arrangement, in particular be embodied identically. In such a case it is advantageous to orient the individual spatial light modulators in such a way that the color patterns of the individual spatial light modulators can generate congruent pixel patterns in the hologram. In such a case, a driving unit of the spatial light modulators is provided, which ensures that, for each pixel of the colored hologram, in each case only one of the spatial light modulators (or none) utilizes the associated pixel for the individual modulation of the corresponding single-colored light steel.

In one preferred embodiment, the spatial light modulators are embodied in areal fashion. This affords the advantage that a whole-area illumination of the hologram is possible. However, spatial light modulators embodied in areal fashion are also particularly well suited to a method in which the spatial light modulators are simultaneously scanned in such a way that with respect to one another in each case the same partial region of the overall pattern, i.e. the color pixel pattern, are scanned and imaged. Spatial light modulators embodied in areal fashion afford the advantage for methods which operate in scanning fashion that synchronization of the spatial light modulators with the scanning single-colored light beams is obviated.

Particularly preferably, use is made of spatial light modulators which are a liquid crystal on silicon (LCoS). These modulate the light and reflect it back, and the polarization direction of the modulated light is changed in the process.

In embodiments in which the spatial light modulators are swept over in scanning fashion, it is advantageous if the light source is a multicolor strip light source that generates a multicolored strip- or line-shaped light beam. Such a light source can comprise a plurality of light individual light sources, for example, the single-colored light beams of which are combined to form a multicolored incident light steel, for example by means of dichroic layers. In order to ensure colinearity of the single-colored light beams, it is possible, for example, by means of a coupling-out at a 4% reflection glass laminar, for example, to implement a control loop that controls a beam quality of the multicolored incident light beam by means of drive elements at the dichroic mirrors, which can be embodied as piezo-drive. As an alternative, the light source can comprise a plurality of individual light sources that generate differently colored single-colored, preferably strip- or line-shaped, light beams that are not combined.

Particularly preferably, it is provided that the light source generates light having three colors that can generate mixed colors by means of additive color mixing, in particular light having the colors red, blue and green. This makes it possible to produce full-colored individualized holograms.

In one preferred embodiment, the feeding and combining optical unit comprises dichroic optical elements and polarization-dependent beam splitters. Depending on the configuration of the light source, the optical elements are used both for beam separation of the colors contained in a multicolored incident light beam into single-colored light beams, for guiding the single-colored light beams onto the spatial light modulators and for combining the individually modulated light beams to form a multicolored exposure light beam. The dichroic optical elements are preferably embodied as dichroic filters that reflect a respective color and preferably 45° with respect to a surface normal and transmit the remaining colors. The polarization-dependent beam splitters are preferably embodied as a polarizing beam splitter cube (PBS).

What is important for the configuration of the individualization unit is to realize path distances of as far as possible identical length between the spatial light modulators and the holographic recording material and the individual pixels of the same spatial light modulator and of the different spatial light modulators along which the light is guided.

A particularly compact construction of the individualization unit, allowing both separation of the colors of a multicolored incident light beam and combination, comprises a dichroic X-prism such as is available for example from Crystechcoating Inc., Shandong, China. It comprises internally two dichroic crossed filters. Such a dichroic X-prism permits the splitting of a three-colored incident light beam that is incident at a front side of the X-prism embodied in cube-like fashion into three single-colored light beams. One of these single-colored light beams emerges at a rear side of the X-prism, said rear side lying opposite the side of incidence, and the other two single-colored light beams emerge at a right and left side of the X-prism, that is to say at the mutually opposite sides arranged between the front side and the rear side. Preferably, a spatial light modulator embodied as LCoS is respectively arranged in front of the left side, the rear side and the right side. The light reflected and modulated by the spatial light modulators is combined again in the dichroic X-prism to form a multicolored modulated light beam. In this case, the light path lengths that occur within an individualization unit configured in this way are of identical length in each case.

In one preferred embodiment, simultaneous scanning, i.e. rectilinearly scanning, beam guidance of the single-colored light beams via the corresponding spatial light modulators is achieved by means of a translational linear movement of an optical system. Consequently, in such embodiments, a translation unit is provided in order to move an optical system linearly in one direction in order to effect scanning of all the spatial light modulators simultaneously by the corresponding single-colored light beams. In one particularly preferred embodiment, the optical system is the individualization unit.

Another embodiment provides for scanning of the spatial light modulators to be effected by pivoting of a deflection mirror, that can be rotated about a mirror rotation axis lying in the mirror plane. Preferably, the rotation axis is situated at a focal point of an imaging optical unit arranged between the mirror and the spatial light modulators arranged on an individualization unit. If use is made of an individualization unit which guides the exposure light beam back along the same light path as the incident light beam is incident, the deflection mirror can also be used to direct the light beam onto the holographic recording material. In such an embodiment, a deflection mirror is arranged relative to the individualization unit and the imaging material, which deflection mirror is mounted such that it can be rotated about a mirror rotation axis lying in the mirror plane, wherein the non-modulated light can be guided via the deflection mirror onto the individualization unit and the modulated light is guided via the deflection mirror onto the imaging material, wherein rotation of the deflection mirror effects scanning of the spatial light modulators.

When a deflection mirror is used, different path lengths occur for the light depending on the position of a pixel on the spatial light modulators. In order to compensate for these path differences that lead to imaging unsharpness, one development of the invention provides for a compensation mirror to be arranged at a distance from the deflection mirror in such a way that it is rotated by a defined relative angle with respect to a plane-parallel orientation with respect to the deflection mirror in the rotation plane of the deflection mirror and, whilst maintaining the distance and the relative angle, can be rotated jointly with the deflection mirror about the mirror rotation axis thereof, wherein the multicolored incident light beam is directed via the deflection mirror, the compensation mirror and an imaging optical unit onto the individualization unit and the modulated exposure light beam is guided via the imaging optical unit, the compensation mirror and the deflection mirror.

In one embodiment, the deflection mirror is embodied as a concave mirror.

In embodiments in which the individualization unit reflects the exposure light beam back along the path of the incident light beam, the exposure unit is preferably arranged opposite the holographic recording material. Coupling of the incident light steel into the connecting line of the individualization unit and of the holographic exposure material is preferably effected via a polarizing beam splitter cube arranged therebetween. The polarized incident light beam is deflected by 90° at the beam splitter cube before being guided onto the individualization unit. The color-separated individualizing modulation takes place there. The modulated exposure light beam changed in terms of polarization is again incident on the polarizing beam splitter cube, but can pass through the latter on account of the change he polarization and impinges on the recording material and the master hologram arranged behind the latter.

Since the interference structures that form in the interference pattern of the holographic recording material are of the order of magnitude of a micrometer, the holographic recording material has to be in a defined position in each case during recording. Since the holographic recording material is generally embodied as a film, the holographic recording material, after arrangement relative to the holographic master, in the case of the method and devices known in the prior art, requires a settling time of the order of magnitude of a few seconds. Therefore, it is advantageous if recording material is arranged in a manner bearing on a drum, and the drum is rotated about a drum axis of the drum during the scanning of the holographic master. The fact that the holographic recording material bears on the drum means that the recording material settles very much more rapidly. Furthermore, the holographic recording material, if it is embodied as an elongated film, can be arranged in a manner bearing on the drum in a region of the drum, that is to say be arranged in a sector of the drum which is angularly remote from the region at which the hologram is recorded by means of an exposure.

Particularly simple beam guidance is achieved with a method and a device in which the holographic master is or has been incorporated into the cylindrical drum or the cylindrical drum segment. During the feeding of the holographic recording material, the latter is thus arranged in front of the holographic master. During the exposure of the holographic recording material, firstly the individually modulated light beam radiates through said holographic recording material, then impinges on the holographic master and is at least partly diffracted and/or reflected and forms an interference pattern representing the individualizing hologram in the holographic recording material. The incorporation of the holographic master into the drum or the drum segment affords the advantage that the scanning of the holographic master and of the holographic recording material can be performed jointly in a synchronized manner by means of the drum movement, that is to say the rotation of the drum about the drum rotation axis. Simplified optical beam guidance is thereby made possible.

It is likewise possible to use a step-and-repeat exposure method, in which the recording material remains stationary in an exposure position during the exposure process and the exposure light beam is guided over the recording material. Once the individualized hologram has been exposed, a new recording material or a new part of the recording material is moved into the exposure position.

In order to guarantee separation of the pixels of the individual spatial light modulators, optical sensors are arranged, preferably outside an imaging region of the hologram, preferably in a tangential plane of an impinging line of the exposure light beam on the holographic recording material, said optical sensors being coupled to a controller in order to detect overlaps of the differently colored pixels of the spatial light modulators and to drive adjusting actuators at the spatial light modulators and/or the optical elements of the feeding and combining optical unit in order to produce a renewed separation of the pixels having different colors.

The invention is explained in greater detail below on the basis of preferred exemplary embodiments. In this case:

DESCRIPTION OF THE INVENTION

Figure 1:
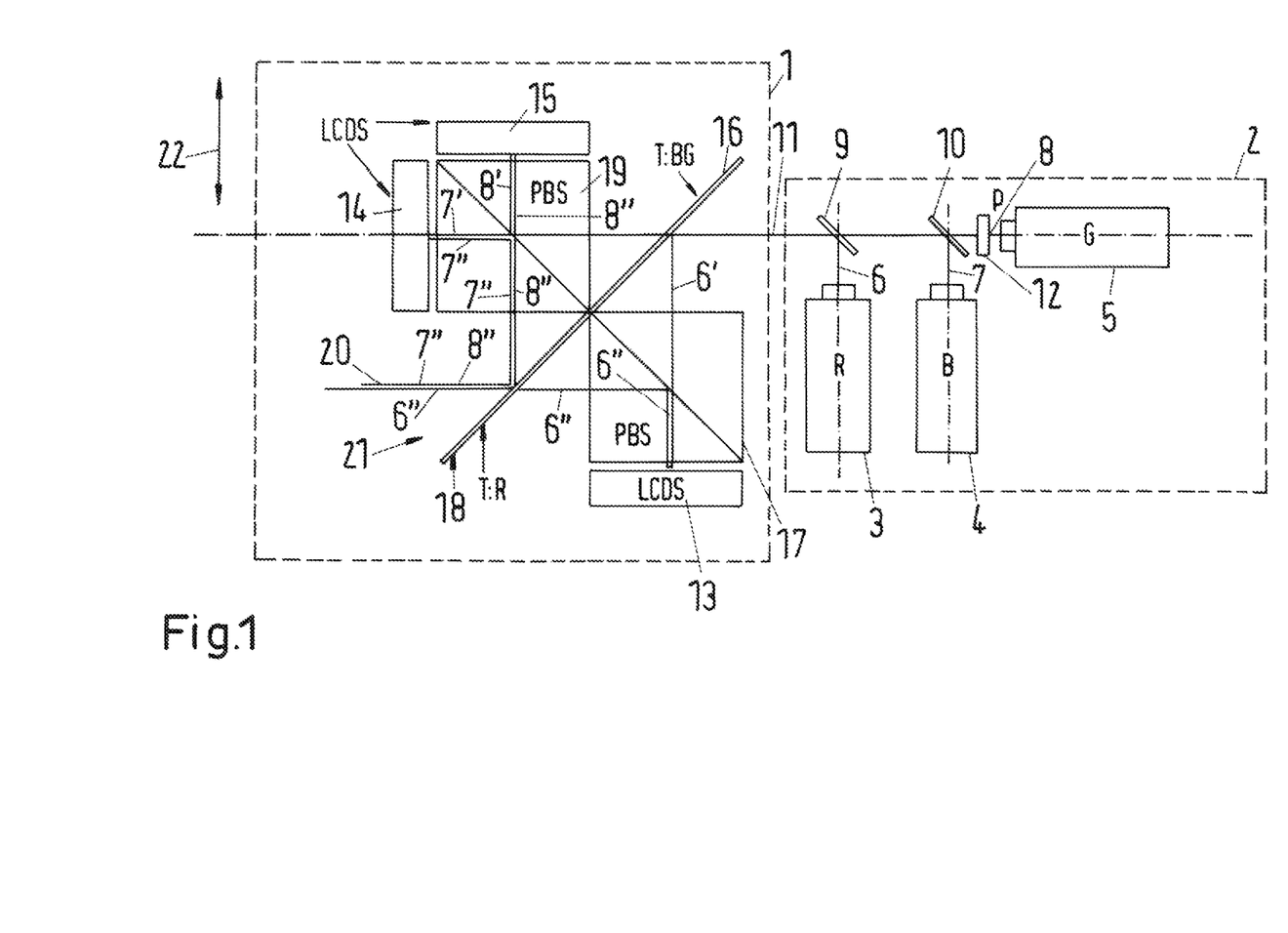
FIG. 1 shows a schematic illustration of an individualization unit and of a light source comprising a plurality of individual light sources.

FIG. 1 schematically illustrates an individualization unit 1 and a light source 2. The light source 2 comprises a plurality of individual light sources 3-5 that respectively generate single-colored light having different wavelengths. In the example illustrated, the individual light sources 3, 4 and 5 generate red, blue and green light, respectively. The individual light sources 3-5 are preferably embodied in such a way that they emit the single-colored light preferably as a strip-shaped or line-shaped light beam, the strip or line shape extending perpendicularly to the plane of the drawing. The single-colored line-shaped light beams 6, 7, 8 are combined in a collinearized manner by means of dichroic mirrors or filters 9, 10 in order to form a multicolored incident light beam 11. The multicolored incident light beam 11 is also referred to as a white light beam since such a light beam is perceived as white by the human eye on account of the color addition. The distinct individual light sources 3, 4, 5 are preferably embodied as lasers since the latter provide the necessary coherence for a holographic imaging. Furthermore, the light from the individual light sources 3, 4, 5 is polarized in the same plane, for example parallel to the plane of the drawing. In order to polarize the single-colored green light beam 8 perpendicularly to the plane of the drawing, a half-wave plate (λ/2 plate) 12 is inserted in its beam path. In order to ensure a collinearity of the individual light beams 6, 7, 8 in the incident light beam 11, it is possible, by means of a coupling-out, for example at a 4% reflection glass laminar, to implement a control loop that controls a beam quality of the incident light beam by means of drive elements at the dichroic mirrors 9 and 10, which can be embodied as piezo-drives. The light source 2 thus constitutes a multicolored strip light source.

The individualization unit 1 comprises spatial light modulators 13, 14, 15 that are in each case embodied as LCoS and are assigned to the colors red, blue, green in this order. Each of these three spatial light modulators 13, 14, 15 is used to individually modulate an associated single-colored light beam 6, 7, 8. The spatial light modulators 13, 14, 15 are arranged on a common carrier unit (not illustrated) of the individualization unit 1. Preferably, the individual spatial light modulators are connected to piezoelectrically driven adjusting actuators (not illustrated) that enable the spatial light modulators 13, 14, 15 to be adjusted relative to one another. The incident light beam 11 is guided to a first dichroic beam splitter 16, which is arranged at an angle of 45° with respect to the incident beam 11. The first dichroic beam splitter 16 is transparent to blue and green light and reflects red light. Consequently, a single-colored red light beam 6' is separated from the incident light beam 11. Said red light beam is incident via a polarizing beam splitter cube 17 on the spatial light modulator 13 assigned to the red color. On account of the polarization direction parallel to the plane of the drawing, the single-colored red light beam 6' is not deflected at the polarizing beam splitter cube 17. The single-colored red light beam is individually modulated in the spatial light modulator 13. The individually modulated red light beam 6" reflected back is changed in terms of its polarization in such a way that it is deflected by 90° in the polarizing beam splitter cube. The individually modulated red light beam 6" finally passes through a second dichroic beam splitter 18, which is transparent to red light. The green and blue single-colored light beams 7', 8', which have passed through the first dichroic beam splitter, are separated from one another at a further polarizing beam splitter cube 19. While the single-colored blue light beam 7' passes through the further polarizing beam splitter cube 19 without being deflected, is individually modulated at the spatial light modulator 14 assigned to the color blue and is guided back into the beam splitter cube as an individually modulated blue light beam 7", the green single-colored light beam 8' is deflected by 90° at the further polarizing beam splitter cube 19 and individually modulated by the spatial light modulator 15 assigned to the color green and is reflected back into the further polarizing beam splitter cube 19 as an individually modulated green light beam 8". Since both the polarization of the blue individually modulated light beam 7" and the polarization of the green individually modulated light beam 8" are changed, now the blue individually modulated light beam 7" is reflected by 90° at the further polarizing beam splitter cube 19 and the green individually modulated light beam 8" is transmitted without being deflected by the further polarizing beam splitter cube. Both single-colored beams 7", 8" impinge on the second dichroic beam splitter and are deflected by 90° by the latter. The second dichroic beam splitter 18 reflects green and blue light. Since all the deflections in each case by 90° and the reflections have effected a change by 180° in the beam directions, all three individually modulated single-colored beams 6", 7", 8" leave the second dichroic beam splitter 18 at the same position and are thus combined as one individually modulated exposure light beam 20. In this case, it is assumed that the suitable distance between the optical elements of a feeding and combining optical unit 21, the first dichroic beam splitter 16 and the second dichroic beam splitter 18 and also the polarizing beam splitter cubes 17, 19, and also the spatial light modulators 13, 14, are arranged at suitable distances from one another. The exposure light beam 20 can now be used to perform a full-colored holographic imaging. The individual spatial light modulators are oriented with respect to one another and driven in such a way that differently colored pixels do not overlap during an imaging of the exposure light beam 20. The spatial light modulators 13, 14, 15 are preferably embodied as identical LCoS.

In such a case, the spatial light modulators are oriented in such a way that the individual pixels would fully overlap one another. On account of the driving of the individual spatial light modulators it is ensured, however, that in each case at most one of the spatial light modulators modulates light in a pixel of the overall pixel pattern arising in the superimposition. Consequently, the overall pixel pattern transported by the exposure light beam 20 contains only single-colored pixels or pixels assigned to none of the colors.

In order to ensure that the individual single-colored light beams 6', 7', 8' sweep over the corresponding spatial light modulators 13, 14, 15 in scanning fashion, the entire individualization unit 1 can be moved at an angle of 45° with respect to the incident single-colored light beams 6, 7, 8, that is to say parallel to a linear translational movement direction 22, that is to say upward and downward in the feeding plane.

Figure 2:
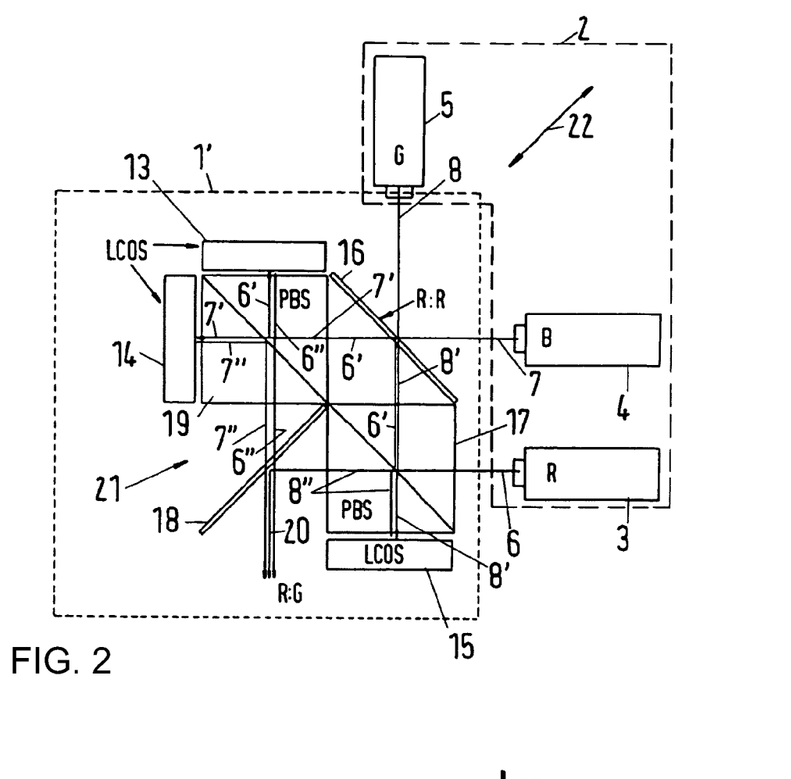
FIG. 2 shows another embodiment of an individualization unit that can be operated with a light source, consisting of a plurality of individual light sources.

FIG. 2 schematically illustrates a further embodiment of an individualization unit 1' and of a light source 2. In this embodiment, the light source 2 comprises three individual light sources 3, 4, 5 that respectively emit a strip-shaped single-colored light beam 6, 7, 8. (Identical technical features are provided with the same reference symbols in all the drawings.) The single-colored red light beam 6', which is polarized perpendicularly to the plane of the drawing, is deflected by 90° by a polarizing beam splitter cube 17 and is deflected again by 90° at a first dichroic beam splitter 16, which reflects red light, and passes into a further polarizing beam splitter cube 19 and is guided again by 90° onto the spatial light modulator 13 assigned to the color red, which is likewise again embodied as LCoS. The blue single-colored light beam 7' and the green single-colored light beam 8', which are in each case polarized parallel to the plane of the drawing, in each case pass through the first dichroic beam splitter 16 and the further polarizing beam splitter 19 and the polarizing beam splitter 17, respectively, onto the corresponding spatial light modulators 14 and 15, respectively, which individually modulate the corresponding single-colored light beams 7' and 8' and reflect them back. The individually modulated single-colored light beams 7" and 8" reflected back, which are changed in terms of their polarization direction, are in each case deflected by 90° at the further polarizing beam splitter cube 19 and the polarizing beam splitter cube 17, respectively. While the individually modulated single-colored green light beam 8" is reflected at the second dichroic beam splitter 18, the individually modulated single-colored light beam 6" and the blue individually modulated single-colored light beam 7" pass through the second dichroic beam splitter 18 at the location at which the green individually modulated single-colored light beam 8" is reflected. Consequently, a combined exposure light beam 20 is produced in the case of this individualization unit 1' as well.

As in the case of the embodiment according to FIG. 1, the individual spatial light modulators 13, 14, 15 and also the further optical elements of the feeding and combining optical unit 21, which comprises the two dichroic beam splitters 16, 18 and the two polarizing beam splitter cubes 17, 19, are embodied in such a way that they are adjustable relative to one another. The spatial light modulators can be readjusted and oriented with respect to one another during operation by means of piezo-driven adjusting actuators. In order to ensure that the individual single-colored light beams 6', 7', 8' sweep over the corresponding spatial light modulators 13, 14, 15 in scanning fashion, the entire individualization unit 1' can be moved at an angle of 45° with respect to the incident single-colored light beams 6, 7, 8, that is to say parallel to a linear translational movement direction 22.

In order to ensure that the individual single-colored light beams 6', 7', 8' sweep over the corresponding spatial light modulators 13, 14, 15 in scanning fashion, the entire individualization unit 1' can be moved at an angle of 45° with respect to the incident single-colored light beams 6, 7, 8, that is to say parallel to a linear translational movement direction 22.

Figure 3:
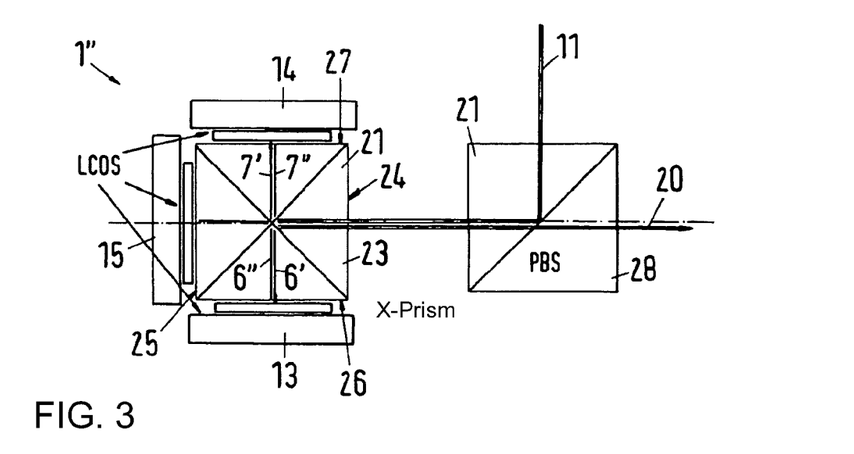
FIG. 3 shows a schematic illustration of an individualization unit on the basis of an X-prism cube.

FIG. 3 illustrates a further embodiment of an individualization unit 1". The latter comprises a so-called X-prism cube 23 comprising two crossed dichroic filters. A multicolored incident light beam 11 enters into the X-prism cube 23 at a front side 24 of the X-prism cube 23. At the crossed integrated dichroic beam splitters, single-colored light beams 6', 7', 8' are separated from the incident light beam 11 that is incident. In one embodiment, the two integrated crossed dichroic beam splitters reflect the colors red and blue, while the green single-colored light beam 8', at a rear side 25 of the X-prism cube 23, impinges on the spatial light modulator 15 associated with it and is individually modulated. The red single-colored light beam 6' and the blue single-colored light beam 7' correspondingly emerge from the X-prism cube 23 at a left side 26 and a right side 27, respectively. There they are individually modulated by the spatial light modulators 13, 14 assigned to the corresponding colors and are reflected back as individual modulated light beams 6" and 8". The individually modulated light beams 6" and 8" reflected back are deflected again by 90° at the crossed dichroic beam splitters and are thus combined with the individually modulated reflected green single-colored light beam 8" to form a multicolored modulated exposure light beam 20. The incident light beam 11 is coupled in, and the individually modulated exposure light beam 20 is coupled out, by means of an additional polarizing beam splitter cube 28.

Figure 4:
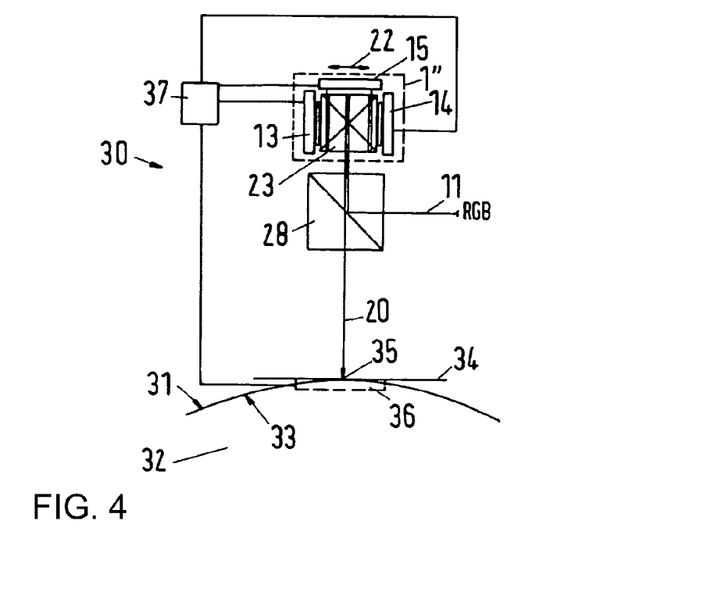
FIG. 4 shows a schematic embodiment of a device for producing full-colored individualized holograms.

FIG. 4 schematically illustrates a device 30 for producing a full-colored individualized hologram. The holographic recording material 31 is fed on a drum 32 in a manner bearing on the latter. A holographic master 33 is incorporated into the drum 32, said holographic master diffracting light having a red, blue and green color, for example. A multicolored incident light beam 11, which is preferably generated as three-colored in the colors red, green, blue, is incident on the additional polarizing beam splitter cube 28 and is individually modulated in a color-separated manner and reflected back by an individualization unit 1" such as has been explained comprehensively in connection with FIG. 3. The individually modulated exposure light beam 20 emerges from the additional polarizing beam splitter cube 28, radiates through the holographic recording material 31 and is at least partly diffracted and/or reflected at the holographic master 33 situated in the drum 32. The diffracted and/or reflected component is superimposed in the holographic recording material with the exposure beam 20 individually modulated in a color-separated manner and thus forms an interference pattern representing the colored individualized hologram.

In the embodiment illustrated, rectilinear scanning, i.e. scanning of the spatial light modulators 13-15, is effected by means of a translational movement of the individualization unit 1" along the translation direction 22. The latter is parallel to a tangential plane 34 to the recording material 31 at an impinging line 35 of the exposure light beam 20, which, like the incident light beam 11, is embodied as strip-shaped perpendicularly to the plane of the drawing. The exposure of the holographic recording material 31 is performed in such a way that the holographic recording material 31 and the holographic master 33 move as a result of movement of the drum 32 in a manner matched to the translational movement of the individualization unit 1". The rotational speed of the drum 32 is chosen such that the period during which radiation passes through the holographic recording material 31 corresponds to an exposure time that takes up a sufficient quantity of energy in the holographic recording material during the passage of the exposure light beam 20 in order to store the hologram represented by the interference pattern. The transillumination and storage are effected in such a way that, in an individualizing overall pattern imaged by the individualization unit 1", there are no pixels in which differently colored light is imaged. This means that no pixels having different colors of the individual spatial light modulators 13-15 overlap. In order to be able to perform a reorientation or adjustment of the individual spatial light modulators 13-15, optical sensors 36 are arranged adjacent to an imaging region, that is to say preferably laterally alongside the drum 32, in the illustration above or below the plane of the drawing, preferably in the tangential plane 34, which optical sensors can detect an overlapping of differently colored pixels and can effect adjustment in order to separate the differently colored pixels by means of a regulating and control unit 37 and adjusting actuators, preferably configured in piezoelectric fashion, which are arranged at the spatial light modulators 13-15.

Figure 5:
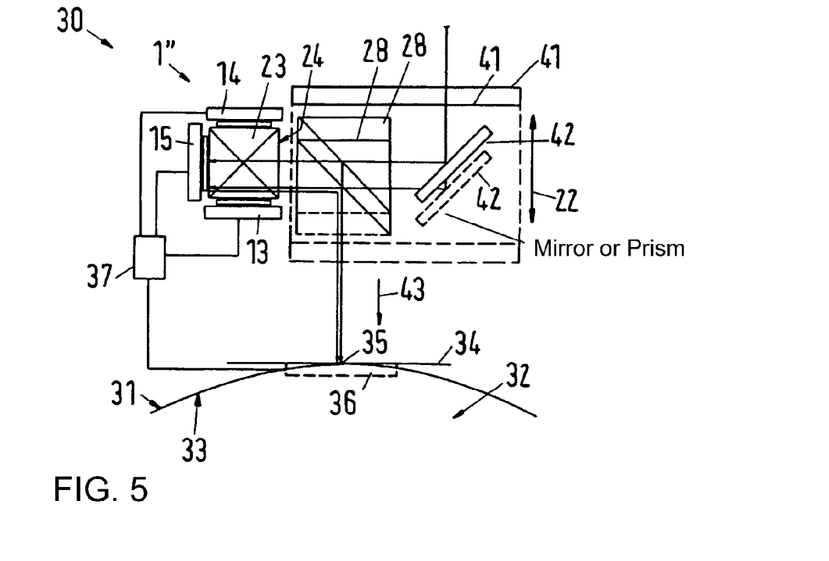
FIG. 5 shows a further embodiment of a device for producing full-colored individualized holograms.
Figure 6:
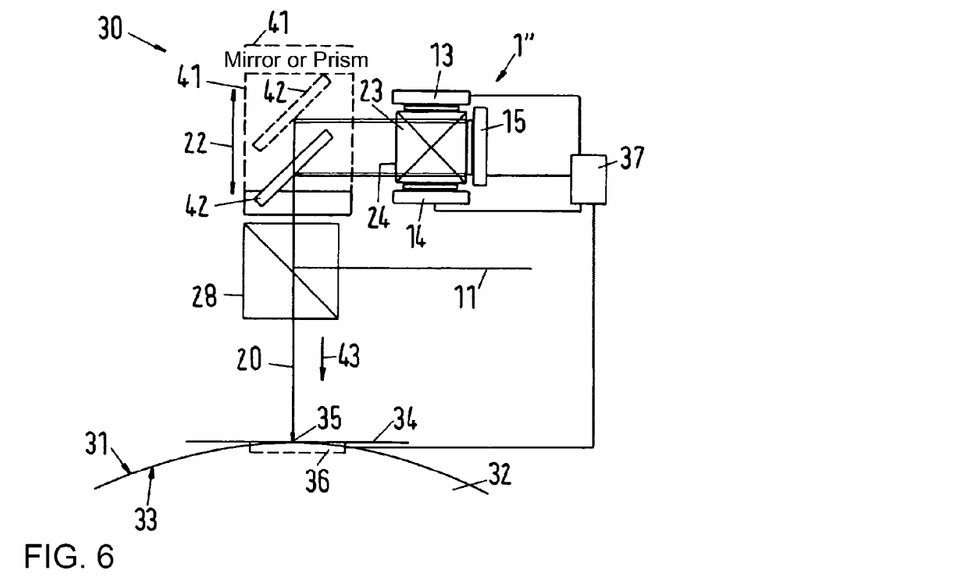
FIG. 6 shows a further embodiment of a device for producing full-colored individualized holograms.

FIGS. 5 and 6 illustrate other embodiments of a device 30 for producing full-colored individualized holograms. In the case of these embodiments, the spatial light modulators 13-15 are swept over in scanning fashion by means of movement of an optical system 41 comprising a deflection mirror 43. In the case of the embodiment according to FIG. 5, the optical system 41 additionally comprises the additional polarizing beam splitter cube 28. In the case of the embodiment according to FIG. 6, the optical system 41 comprises only the deflection mirror 42.

In both embodiments, the individualization unit 1" is rotated by 90° relative to the embodiment according to FIG. 4. This means that a front side 24 of the X-prism cube 23 is oriented parallel to an exposure direction 43. In the case of the embodiment according to FIG. 5, the incident light beam 11 is incident on the deflection mirror 42 likewise parallel to the exposure direction 43, said deflection mirror being arranged at an angle of 45° with respect thereto and deflecting the incident light beam 11 by 90° onto the individualization unit 1". From the latter, the exposure light beam 20 individually modulated in a color-separated manner is reflected back and is coupled out at the additional beam splitter 28 and deflected by 90° in the direction of the holographic recording material 31. Scanning of the spatial light modulators 13-15 is achieved by the optical system 41 being translationally linearly moved parallel to the exposure direction 43, that is to say parallel to the front side 24 of the X-prism cube 23 of the individualization unit 1".

FIG. 5 illustrates said optical system 41 in a second position using dashed lines. It can readily be discerned that the impinging position or impinging line 35 relative to a drum rotation axis (not illustrated) has not changed during scanning.

In FIG. 6, the incident light beam 11 is firstly incident on the additional polarizing beam splitter cube 28, is deflected by 90° and then impinges on the deflection mirror 42 of the optical system 41. The incident light beam 11 is deflected again by 90° by the deflection mirror 42. The exposure light beam 20 individually modulated by the individualization unit 1" is directed via the deflection mirror 42 and the additional polarizing beam splitter cube 28 onto the holographic recording material 31. The optical system 41 is again illustrated in a second position using dashed lines, into which second position it has been linearly displaced by means of a translational movement along the translation direction 22, which is oriented parallel to the exposure direction 43 in this case, in order to effect scanning of the spatial light modulators 13-15.

Figure 7:
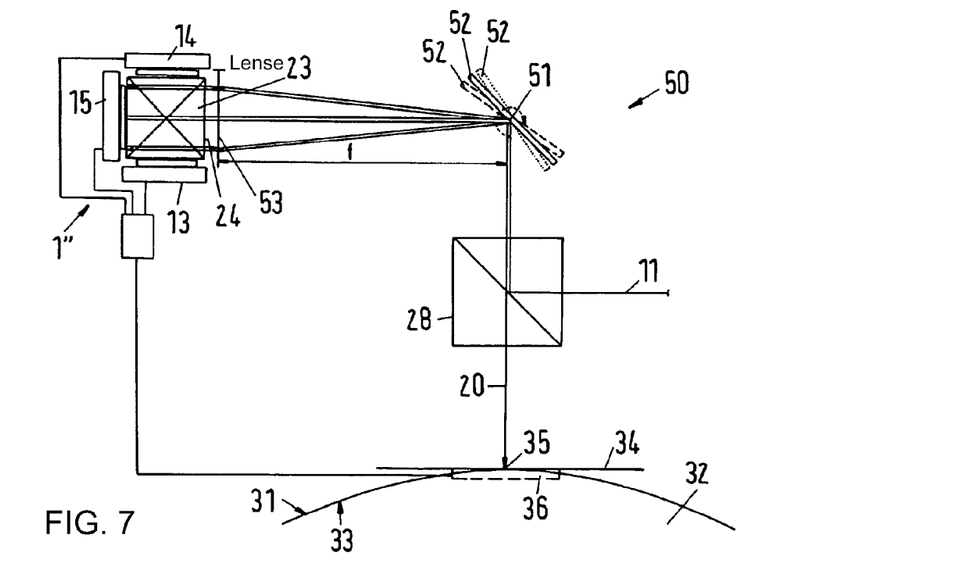
FIG. 7 shows an embodiment of a device for producing full-colored individualized holograms which uses a deflection mirror for generating a scanning incident light beam.

FIG. 7 illustrates a further embodiment of a device 50 for producing an individualized colored hologram. In the case of this embodiment, the incident light beam 11 is firstly deflected by 90° by means of the additional polarizing beam splitter cube 28, and then impinges on a deflection mirror 52 mounted such that it can be rotated about a mirror rotational axis. In this case, the mirror rotation axis 51 is situated in the mirror plane of the deflection mirror 52. The impinging line of the incident light beam 11 coincides with the mirror rotation axis 51 of the deflection mirror 52. This is furthermore situated at a focus of an imaging optical unit 53 arranged in front of the individualization unit 1". Scanning of the spatial light modulators 13-15 can be achieved by means of rotary tilting. This scanning is, of course, synchronized with the rotary movement of the drum, as has been explained in connection with FIG. 4. In the case of this embodiment, however, different path lengths occur along which the exposure light beam is guided from the individual sections of the spatial light modulators 13-15 to the holographic recording material 31.

Figure 8:
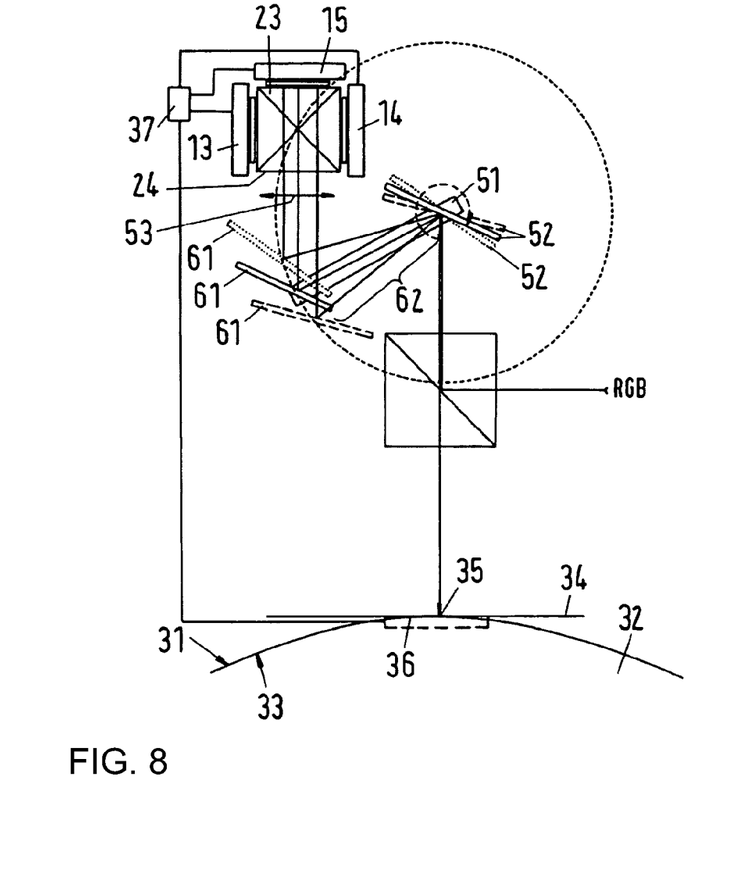
FIG. 8 shows an embodiment of a device for producing full-colored individualized holograms which uses a scanning mirror pair.

FIG. 8 shows an embodiment in which these path length differences are compensated for by a further deflection mirror 61, which is therefore also referred to as a compensation mirror. Said further deflection mirror 61 can be rotated at a fixed distance 62 and a fixed relative angle δα jointly with the deflection mirror 52 about the storage rotation axis 51 thereof. In the case of this embodiment, the incident light beam 11 is directed via the additional polarizing beam splitter cube 28, the deflection mirror 52 and the further deflection mirror 61 and an imaging optical unit 53 onto the individualization unit 1". The exposure light beam 20 is directed from the individualization unit 1" via the imaging optical unit 53, the further deflection mirror 61 and the deflection mirror 52 and also the additional polarizing beam splitter cubes 28 onto the holographic recording material 31. In the case of this embodiment, too, the mirror rotation axis 51 of the deflection mirror 52 is situated at the focus of the imaging optical unit 53.

The embodiments described for the individualization system 1, 1', 1", the light source 2 and the device 30, 50 for producing full-colored individualized holograms are merely of exemplary nature. It is evident to the person skilled in the art that other configurations are possible. Particularly in connection with the embodiments according to FIGS. 4 to 6, a description of the imaging optical unit has been dispensed with in order not to complicate the description of the invention unnecessarily.

LIST OF REFERENCE SYMBOLS 1, 1', 1" Individualization unit
2 Light source
3 Individual light source (red)
4 Individual light source (blue)
5 Individual light source (green)
6, 6' Single-colored light beam (red)
7, 7' Single-colored light beam (blue)
8, 8' Single-colored light beam (green)
6" Single-colored individually modulated light beam (red)
7" Single-colored individually modulated light beam (blue)
8" Single-colored individually modulated light beam (green)
9, 10 Dichroic mirrors
11 Incident light beam
12 Half-wave plate
13 Spatial light modulator (red)

14 Spatial light modulator (blue)
15 Spatial light modulator (green)
16 First dichroic beam splitter
17 Polarizing beam splitter cube
18 Second dichroic beam splitter
19 Further polarizing beam splitter cube
20 Exposure light beam
21 Feeding and combining optical unit
22 Translational movement direction
23 X-prism cube
24 Front side
25 Rear side
26 Left side
27 Right side
28 Additional polarizing beam splitter
30 Device for producing an individualized hologram
31 Holographic recording material
32 Drum
33 Holographic master
34 Tangential plane
35 Impinging line
36 Optical sensors
37 Control unit
41 Optical system
42 Deflection mirror
43 Exposure direction
50 Device for producing an individualized hologram
51 Mirror rotation axis
52 Deflection mirror
53 Imaging optical unit
61 Further deflection mirror
62 Fixed distance

The invention claimed is:

1. A method for producing a colored individualized hologram, which comprises the steps of:
generating light having a plurality of different colors (wavelengths);
spatially modulating the light individually in a color-separated manner resulting in modulated light, the light is modulated simultaneously in the color-separated manner by means of a plurality of spatial light modulators, each of the plurality of different colors of the light is assigned a dedicated one of said spatial light modulators that individually modulates a single-colored light beam and having a corresponding color resulting in a plurality of single-colored modulated light beams having the plurality of colors;
effecting a translational linear movement of an optical system to achieve simultaneous scanning beam guidance of single-colored light beams across a corresponding one of the spatial light modulators;
combining collinearly the plurality of single-colored modulated light beams having the plurality of colors to form a multicolored exposure light beam modulated individually in a color-separated manner, the spatial light modulators being disposed with respect to one another in such a way, and the combining is performed such that each pixel of an individualized hologram is assigned exactly one of the plurality of colors;
optically guiding the modulated light such that the light is at least one of partly diffracted and reflected at a holographic master and is superimposed with at least one of modulated non-diffracted light and reflected light in one holographic recording material such that an interference pattern representing the multicolored individualized hologram will form; and
storing the multicolored individualized hologram.

2. The method according to claim 1, which further comprises modulating the light by means of the spatial light modulators being embodied in an areal fashion.

3. The method according to claim 1, which further comprises modulating the light by means of the spatial light modulators being embodied as LCoS.

4. The method according to claim 1, which further comprises generating the light as one of a multicolored strip-shaped light beam and a multicolored line-shaped light beam.

5. The method according to claim 1, which further comprises generating the light having the plurality of different colors in a form of a plurality of differently colored single-colored, light beams having a shape selected from the group consisting of strip shaped light beams and line-shaped light beams.

6. The method according to claim 1, which further comprises generating the light in three colors which can generate mixed colors by means of additive color mixing.

7. The method according to claim 1, which further comprises generating the light having the plurality of colors as a collinearly combined incident light beam of a plurality of single-colored polarized light beams.

8. The method according to claim 1, which further comprises guiding a plurality of single-colored light beams onto the spatial light modulators by means of dichroic optical elements and polarization-dependent beam splitters and are combined collinearly to form the multicolored exposure light beam.

9. The method according to claim 1, which further comprises providing the optical system with an individualization unit having the spatial light modulators and a feeding and combining optical unit for directing single-colored light beams onto the spatial light modulators and for collinearly combining the single-colored modulated light beams to form the multicolored exposure light beam.

10. The method according to claim 1, which further comprises effecting a scanning of the spatial light modulators by pivoting a deflection mirror, which can be rotated about a mirror rotation axis lying in a mirror plane.

11. The method according to claim 10, which further comprises disposing a compensation mirror at a distance from the deflection mirror such that the compensation mirror is rotated by a defined relative angle with respect to a plane-parallel orientation with respect to the deflection mirror in a rotation plane of the deflection mirror and, while maintaining a distance and a relative angle, is rotated jointly with the deflection mirror about the mirror rotation axis thereof, wherein a multicolored incident light beam is directed via the deflection mirror, the compensation mirror and an imaging optical unit onto the individualization unit and the multicolored exposure light beam is guided via the imaging optical unit, the compensation mirror and the deflection mirror.

12. The method according to claim 1, which further comprises:
disposing the holographic recording material in a manner bearing on a cylindrical drum; and
rotating the cylindrical drum about a drum axis of the cylindrical drum during scanning of the holographic master.

13. The method according to claim 12, which further comprises incorporating the holographic master into the cylindrical drum.

14. The method according to claim 10, which further comprises guiding the light such that an optical sensor, disposed outside an imaging region of the hologram, in a tangential plane of an impinging line of the multicolored exposure light beam on the holographic recording material, is illuminated, and adjusting actuators of at least one of the spatial light modulators and optical elements of the feeding and combining optical unit are driven by means of a controller to produce a renewed separation of overlapping pixels having different colors and to guarantee a separation of the pixels having different colors.

15. The method according to claim 6, which further comprises selecting the three colors to be red, blue and green.

16. A device for producing a colored individualized hologram, comprising:
a light source providing light having a plurality of different colors (wavelengths);
a holographic master;
an individualization unit for spatially modulating the light individually in a color-separated manner into modulated light, the modulated light is optically guided such that the light is at least one of partly diffracted and reflected at said holographic master and is superimposed with at least one of modulated non-diffracted and reflected light in one holographic recording material such that an interference pattern representing a multicolored individualized hologram forms and the multicolored individualized hologram is stored, said individualization unit contains a plurality of spatial light modulators, and each of the plurality of colors of the light is assigned a dedicated one of said spatial light modulators, said individualization unit further having a feeding and combining optical unit, said feeding and combining optical unit configured for directing single-colored light beams onto said spatial light modulators each assigned to respective colors, said spatial light modulators individually modulate corresponding ones of the single-colored light beams simultaneously in accordance with corresponding color pixel patterns, and for collinearly combining single-colored modulated light beams to form an exposure light beam, and said spatial light modulators are oriented with respect to one another and driven such that beam combining is performed such that each of the pixels of the individualized hologram is assigned exactly one of the plurality of colors;
an optical system; and
a translation unit for moving said optical system linearly in one direction for effecting scanning of all said spatial light modulators simultaneously by the corresponding single-colored light beams.

17. The device according to claim 16, wherein said spatial light modulators are embodied in an areal fashion.

18. The device according to claim 16, wherein said spatial light modulators are embodied as LCoS displays.

19. The device according to claim 16, wherein said light source is a multicolored strip light source that generates one of a multicolored strip-shaped incident light beam and a multicolored line-shaped incident light beam.

20. The device according to claim 16, wherein said light source includes a plurality of individual light sources that generate differently colored single-colored light beams selected from the group consisting of strip-shaped lights beams and line-shaped light beams.

21. The device according to claim 16, wherein said light source generates light having three colors that can generate mixed colors by means of additive color mixing.

22. The device according to claim 16, wherein said feeding and combining optical unit includes dichroic optical elements and polarization-dependent beam splitters.

23. The device according to claim 16, wherein said optical system includes said individualization unit.

24. The device according to claim 16, further comprising a deflection mirror disposed relative to said individualization unit and is disposed relative to the holographic recording material, said deflection mirror being mounted such that said deflection mirror can be rotated about a mirror rotation axis lying in a mirror plane, wherein a non-modulated light can be guided via said deflection mirror onto said individualization unit and the modulated light is guided via said deflection mirror onto the holographic imaging material, wherein rotation of said deflection mirror effects scanning of said spatial light modulators.

25. The device according to claim 24, wherein the scanning of said spatial light modulators can be effected by pivoting of said deflection mirror that can be rotated about said mirror rotation axis lying in the mirror plane.

26. The device according to claim 24,
wherein said light source providing the light having the plurality of different colors as a multicolored incident light beam;
further comprising an imaging optical unit; and
further comprising a compensation mirror disposed at a distance from said deflection mirror such that it is rotated by a defined relative angle with respect to a plane-parallel orientation with respect to said deflection mirror in a rotation plane of said deflection mirror and, while maintaining a distance and a relative angle, can be rotated jointly with said deflection mirror about the mirror rotation axis thereof, wherein the multicolored incident light beam is directed via said deflection mirror, said compensation mirror and said imaging optical unit onto said individualization unit and the exposure light beam is guided via said imaging optical unit, said compensation mirror and said deflection mirror.

27. The device according to claim 16, further comprising:
a drum drive device; and
a cylindrical drum, the holographic recording material can be fed in a manner bearing on said cylindrical drum, said cylindrical drum is coupled to said drum drive device for rotating said cylindrical drum about a drum rotation axis during a scanning of said holographic master.

28. The device according to claim 27, wherein said holographic master is incorporated into said cylindrical drum.

29. The device according to claim 16, further comprising:
a controller; and
at least one optical sensor for overlapping of the differently colored pixels is disposed outside an imaging region of the hologram, in a tangential plane of an impinging line of the exposure light beam on the holographic recording material, and is coupled to said controller for driving adjusting actuators of at least one of said spatial light modulators and said optical elements of said feeding and combining optical unit to produce a renewed separation of overlapping pixels having different colors and in order to guarantee a separation of the pixels having different colors, wherein the light is guided in such a way that the exposure light beam illuminates said at least one optical sensor.

30. The device according to claim 21, wherein said light source generates light having the colors red, blue and green.

31. The device according to claim 16, wherein said feeding and combining optical unit includes two dichroic beam splitters and two polarizing beam splitter cubes.

32. The device according to claim 22, wherein said feeding and combining optical unit includes one dichroic X-prism cube.

33. The device according to claim 32, wherein said spatial light modulators are disposed on three sides of said dichroic X-prism cube.

* * * * *